Aug. 21, 1945.　　J. TANENBAUM　　2,383,426
AUTOMOBILE CRANE
Filed Sept. 1, 1943　　3 Sheets-Sheet 2
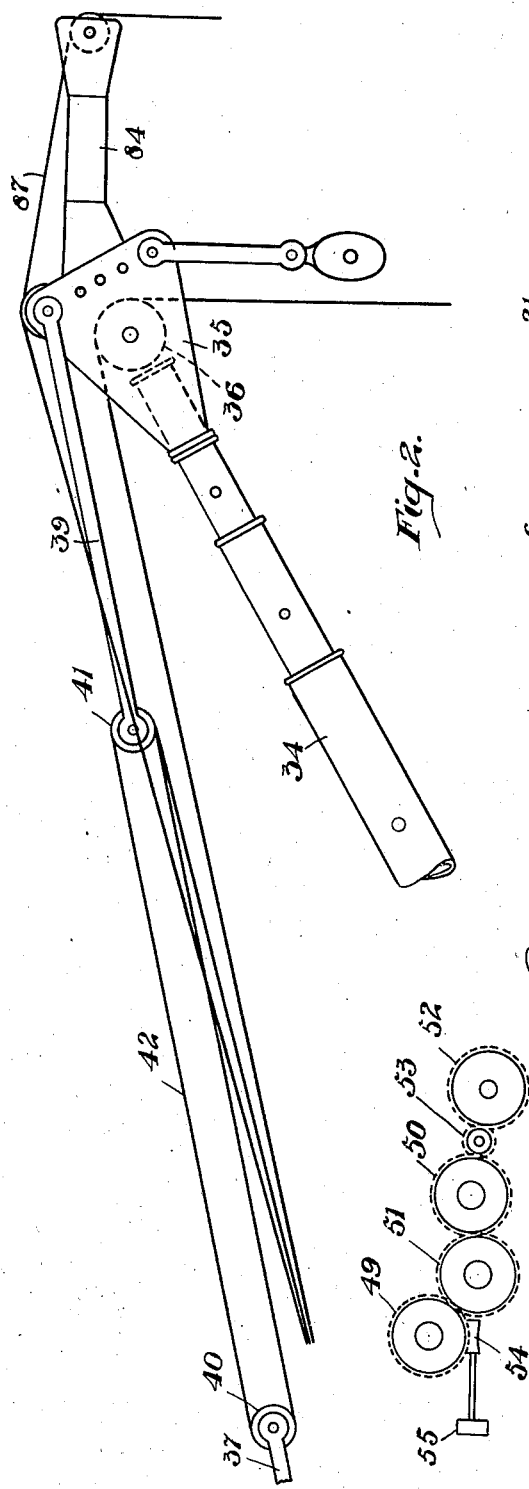
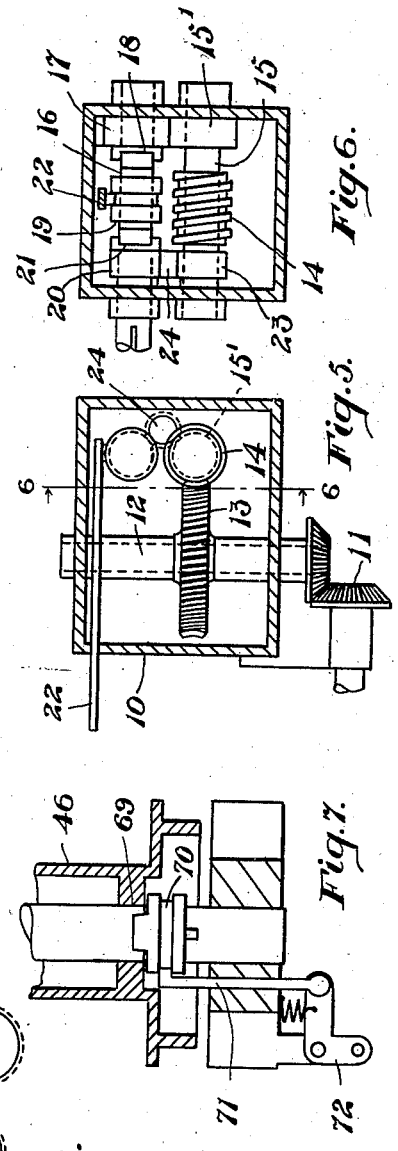
Inventor
Joseph Tanenbaum
by
HJSDennison
atty.

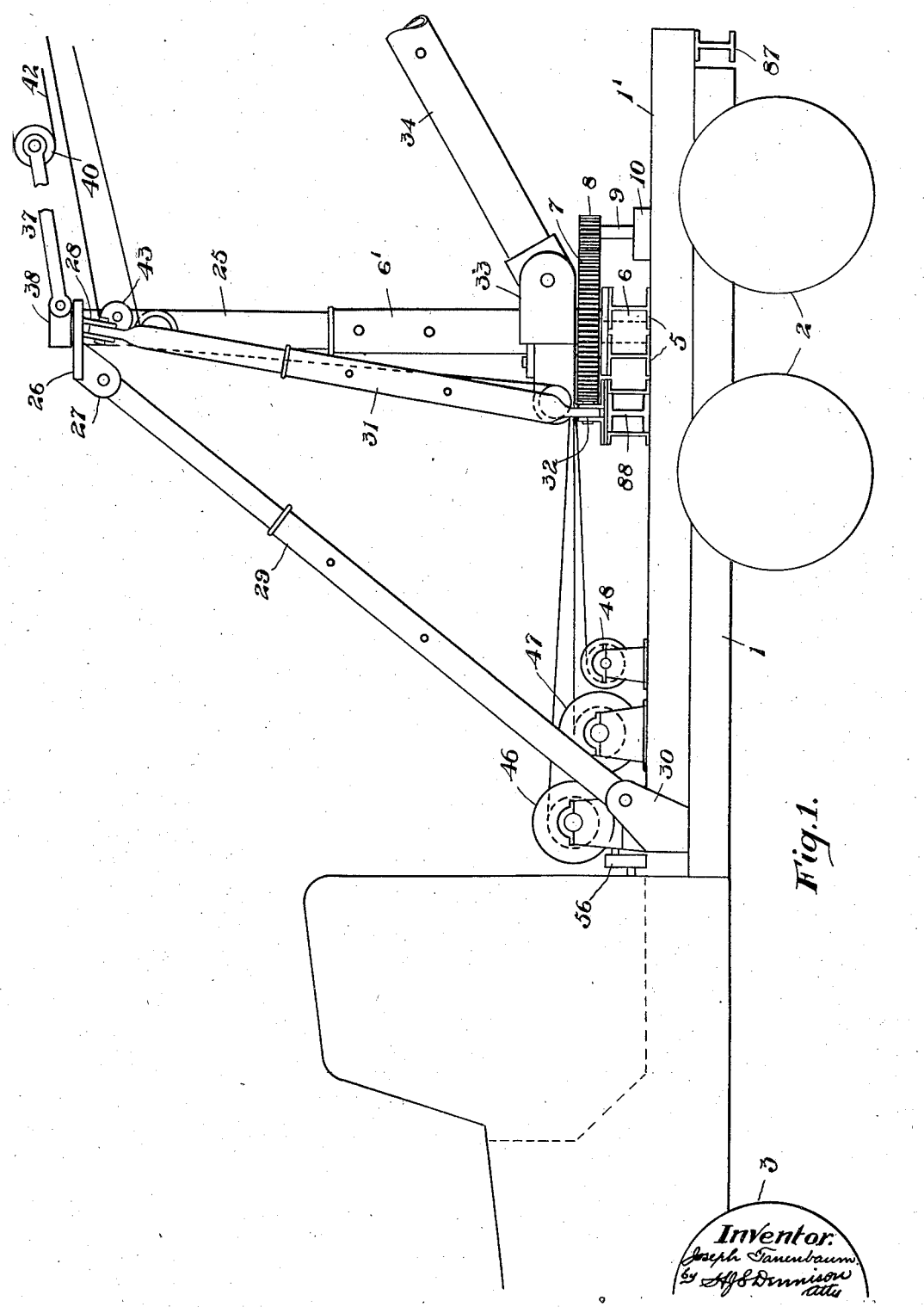

Aug. 21, 1945. J. TANENBAUM 2,383,426
AUTOMOBILE CRANE
Filed Sept. 1, 1943 3 Sheets-Sheet 3
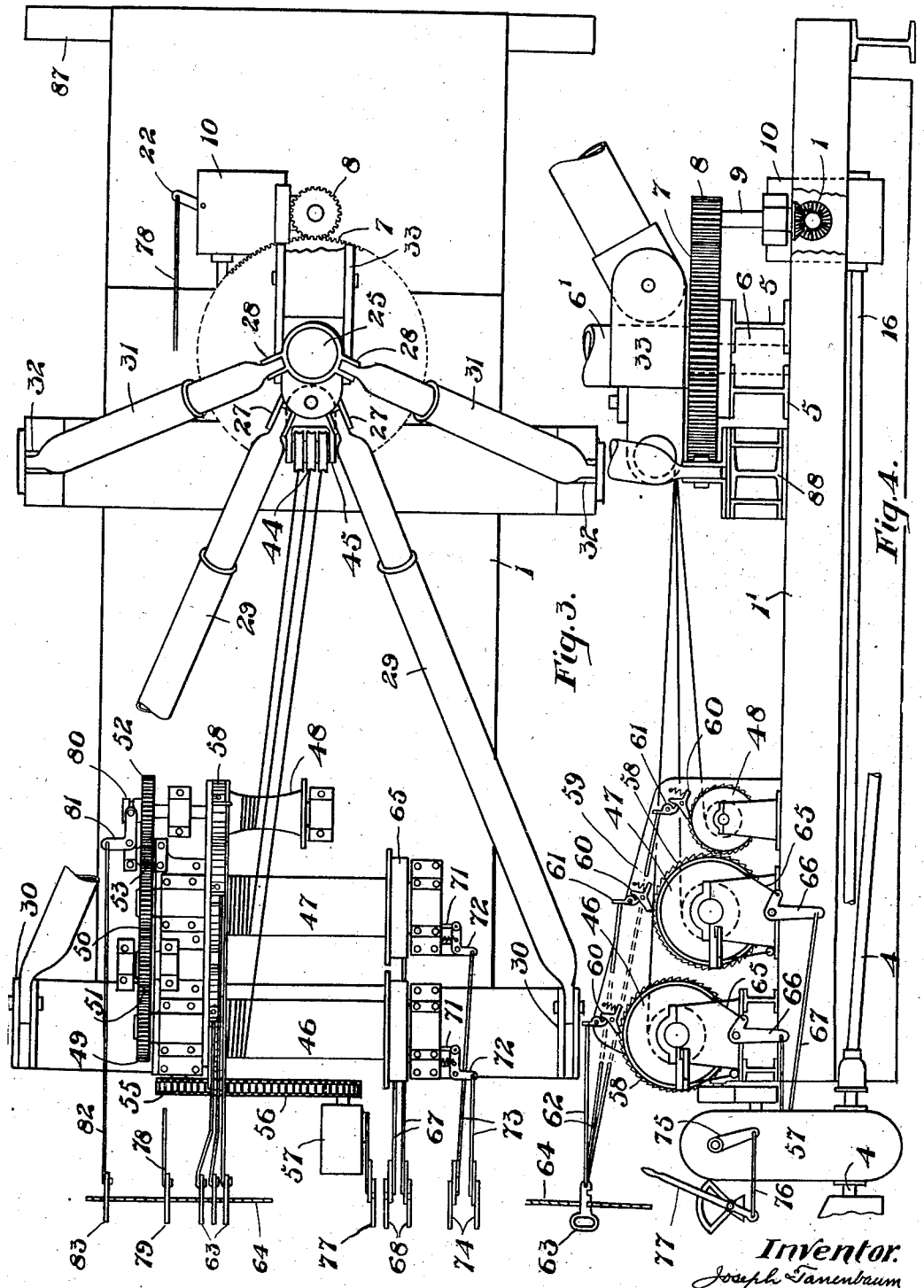
Inventor.
Joseph Tanenbaum
by H.S. Dennison
atty.

Patented Aug. 21, 1945

2,383,426

UNITED STATES PATENT OFFICE 2,383,426

AUTOMOBILE CRANE

Joseph Tanenbaum, Toronto, Ontario, Canada

Application September 1, 1943, Serial No. 501,043

6 Claims. (Cl. 212—55)

The principal objects of this invention are to provide an automobile crane in which a swinging boom is mounted on a truck platform and the hoisting and boom swinging mechanism is operated directly from the truck driving engine, the several control devices being arranged within the truck cab.

A further object is to devise a crane structure in which the boom, mast and braces are extensible so that the crane will have a wide range of operation.

The principal features of the invention consist in the novel construction and arrangement of a telescopic tubular mast stepped in and supported by a gear wheel, journalled on a truck platform, the mast being stayed by telescopic legs pivotally connected to the top section of the mast and to lateral extensions of the truck platform, said gear being operated to swing the boom through a gear mechanism operatively connected with a power take-off connected to the truck engine and controlled from the cab of the truck to swing the boom in lateral directions.

A further important feature consists in the arrangement of hoisting drums on the truck platform forward of the mast operatively connected with the truck engine through a power take-off interposed in the propeller shaft of the driving mechanism of the truck, said drums being controlled by separate clutches and brakes operable from the truck cab.

In the accompanying drawings

Figure 1 is a side elevation partly broken away of a truck and crane constructed in accordance with this invention.

Figure 2 is a side elevation of the outer end of the boom not shown in Figure 1.

Figure 3 is an enlarged plan view of the mast and its supports and the hoisting and control mechanism.

Figure 4 is a side elevational view of the hoisting gear and the lower portion of the crane as shown in Figure 3.

Figure 5 is an enlarged mid-sectional view of the gear mechanism for swinging the boom.

Figure 6 is a cross sectional view through the boom swinging gear taken on the line 6—6 of Figure 5.

Figure 7 is an enlarged sectional detail of the clutch mechanism of one of the hoisting drums.

Figure 8 is a diagrammatic elevational view of the gear drive of the several hoisting drums.

Many types of present-day out-door construction work require the use of heavy duty cranes and it is highly desirable that such cranes be readily movable to handle the lifting of heavy loads in various localities of the structure and the present invention has been devised to meet such requirements and yet be capable of being readily adjusted for transport in highway and urban traffic.

In the structure herein shown a platform truck chassis I is mounted on suitable regulation heavy duty twin tractor wheels 2 and the forward end is mounted on regulation wheeled equipment 3 and carries a structural platform I'.

The truck engine is mounted in the forward part of the chassis and is not shown as the construction is standard and the regular propeller shaft 4 is carried back to the wheels 2 and drives same through a regulation equipment.

Mounted on the platform I' toward its rear end and over the traction wheels 2 are paired cross beams 5 between which is arranged, centrally of the width of the platform, a block 6 which forms a step bearing for the lower pivot end of the bottom tubular section 6' of the crane mast.

A large horizontal spur gear 7 is rigidly secured to the lower mast section and meshing with said gear is a pinion 8 mounted on a vertical shaft 9 extending from a gear box 10 which is suitably rigidly mounted in the platform structure.

The pinion shaft 9 is connected through bevel gears 11 with a cross shaft 12 journalled in the gear box and on which is mounted a worm wheel 13 which meshes with a worm 14 on a shaft 15 journalled in said gear box. A shaft 16 is arranged parallel with the shaft 15 and loosely mounted on one end thereof is a spur gear 17 meshing with a spur gear 15' rigidly mounted on the worm shaft. The gear 17 is provided with a toothed clutch face 18 which is engaged by a sliding clutch member 19 keyed on the shaft 16. A spur gear 20 provided with a toothed clutch face 21 is loosely mounted on the other end of the shaft 16 and is engaged and disengaged by the slidable clutch member which is operated by a lever 22. A spur gear 23 matching the gear 20 is secured on the worm shaft 15 and the gears 23 and 20 intermesh with an idler gear 24. By shifting the clutch member the worm and worm gear and pinion 8 may be driven in either direction to operate the gear 7 of the mast. The shaft 16 extends forwardly from the gear box 10 and is operatively connected at its forward end to the truck engine through a power take-off (not shown) of a standard design mounted on the engine structure.

The lower tubular mast section 6' has telescopically mounted therein an upper section 25 on the upper end of which is mounted a bracket plate 26 having forwardly extending paired jaws 27 and laterally extending paired jaws 28.

Telescopic tubular brace legs 29 are pivotally mounted in the jaws 27 and extend forwardly and downwardly and are pivotally secured in jaw brackets 30 mounted on the outer ends of a beam extending transversely of the chassis platform 1. Similar telescopic tubular brace legs 31 are pivotally secured in the lateral jaws 28 on the mast and extend laterally outward and the lower ends are pivotally secured laterally outward and the lower ends are pivotally secured in jaw brackets 32 mounted on the outer end of a transverse beam mounted on the chassis slightly forward of the mast bearing.

Each of these tubular telescopic legs and the mast are provided with suitable means for locking the telescoped members in several positions, such means being preferably in the form of pins inserted transversely therethrough. When the mast is lengthened the legs are correspondingly lengthened.

A bracket 33 is rigidly secured at the lower end of the mast close to the gear 7 and pivotally mounted in this bracket is the lower end of a tubular telescopic boom 34 which is formed in several sections. On the outer end of the boom 34 is mounted a pair of sheave plates 35 between which is mounted the main load sheave 36.

A sheave link 37 is pivotally secured to a cap 38 on the top of the mast and similar link 39 is pivotally mounted between the boom sheave plates 35 and sheaves 40 and 41 on the free ends of the said links are connected by the boom cable 42 which is carried over a sheave 43 on the mast head and extends downwardly and through a sheave 44 mounted in a bracket 45 pivotally mounted at the base of the mast, said cable extending forwardly to the hoisting gear.

The hoisting gear is mounted at the forward end of the chassis platform close to the cab and it comprises parallelly arranged drums 46, 47 and 48. These are mounted in suitable bearings, the bearings of the drum 46 being preferably arranged at a higher level than the drum 47, and the drum 48 is at a lower level than the drum 47. This sloping arrangement is desirable in order that the cables from the drum 46 be passed over drum 47 and from drum 47 may pass over drum 48 in extending rearwardly to the sheaves mounted in the bracket 45 at the base of the mast.

Spur gears 49 and 50 are secured on one end of the shaft of the drums 46 and 47 respectively and these intermesh with an idler gear 51 mounted in suitable bearings.

A gear 52 mounted on the shaft of the drum 48 is arranged in alignment with the gears 49 and 50 and meshes with an idler gear 53 which also meshes with the spur gear 50. There is thus a driving connection between all of the drum shafts.

The shaft of the drum 46 has mounted thereon a worm wheel 54 which is driven by a worm connected with a gear 55 driven by a chain belt 56 which extends from a gear carried by a power take-off 57. This power-take-off is connected with the engine propeller shaft 4.

The details of construction of the power take-off are not disclosed as such mechanism is of standard construction.

The drums 46, 47 and 48 are each provided with peripheral toothed ratchet surfaces 58 and mounted on a suitable supporting plate 59 arranged at the ends of the drums are ratchet dogs 60 which are spring held in engagement with the ratchet teeth on the drum, and disengaging pawls 61 are pivotally mounted on the plate 59 and connected with rods or cables 62 to hand-operated control members 63 arranged in a plate 64 at the back of the cab of the truck. These control members are notched to be retained in position on the supporting plate to hold the dogs free of the ratchets 4 to allow them to be spring-held in contact with the ratchets.

These ratchets serve to hold the drums securely upon the winding up of the cables mounted thereon in operating any of the loaded parts to which the cables are connected.

Each of the drums 46 and 47 is provided with a braking surface at the end opposite to the ratchets 58 and brake bands 65 are mounted to encircle these brake surfaces, one end of each band being connected to a rigid pivot on the bearing support and the other being connected to a bell crank lever 66.

Each of the levers is connected by a rod or cable 67 to a suitable operating lever 68 arranged in the cab. By means of these band brakes and hand-controlled levers the rotation of the drums in lowering loads can be controlled.

Each of the drums 46 and 47 is provided with an internal toothed clutch face 69 which is engaged by a toothed clutch member 70 slidably and non-rotatably mounted on the drum shaft, which shaft is driven through the gearing hereinbefore described.

Each of the clutch members 70 is operated by a rod 71 connected thereto and extending out through the bearing support and connected to a bell crank 72 mounted on the bearing support. Each of said bell cranks is spring-operated to hold the clutch member in clutching engagement with the drum, and rods 73 are connected to the bell cranks and to levers 74 arranged in the cab.

The power take-off 57 is provided with an operating lever 75 which is connected by a rod 76 with a control lever 77 arranged in the cab.

The levers 68, 74 and 77 are preferably all arranged in transverse alignment in the cab and close together so that the power take-off, the brakes and the clutches of the drums may all be conveniently handled.

The clutch lever 22 extending from the gear box 10 and controlling the mechanism for swinging the boom is connected by a rod 78 with a control member 79 similar to the members 63 connected with the ratchets of the hoisting drums.

The drum 48 is provided with a clutch member slidably and non-rotatably mounted on the shaft of the drum 48. This clutch is adapted to engage with the gear 52 to drive the drum shaft and said clutch is operated by a bell crank lever 81 connected by a rod 82 to a control member 83 similar to the controls 63 and 79. These controls are preferably arranged closely together so that the operator may readily reach any of them from his control position in the cab.

In the operation of the device constructed as described, it being an integral part of a mobile truck, it can be driven from place-to-place and readily maneuvered into position for the handling of a load. The telescopic structure of the crane enables it to be reduced to minimum height and length of boom for operating in traffic, and to permit passage under minimum overhead clearances and entrances to buildings and when it is located in relation to the work the boom and its mast and stays may be lengthened out to suit the requirements.

When the boom reach adjustments have been made the driver of the truck may give his attention to the hoisting controls. By operating the lever 77 he will mechanically connect the engine shaft through the power take-off 57 with the hoisting drum. So also by manipulating the control 79 he may throw the swinging gear into operation to rotate the spur gear 7 on the boom in either direction, or, by moving the gear to neutral the worm drive will hold it securely in position.

The operator by manipulating the drum 47 by releasing the brake and operating the clutch through the control lever 74, may wind up the cable for raising and lowering the boom. As the cable is wound up on the drum the ratchet member holds it securely. In lowering, the ratchet will be released by operating one of the control members 63 and the unwinding of the drum is then controlled by the brake operated by one of the levers 68.

When the boom has been adjusted to the desired angle the boom drum may be locked, then the hoisting drum 46 may be manipulated in a similar manner for operating the load cable.

The third and smaller hoisting drum 48 is provided to be operated in connection with an extension 84 to the boom. This extension, as illustrated in Figure 2, is inserted between the sheave plates 35 on the end of the boom and interlocks with the cross bolts 85. This extension carries a sheave 86 over which a cable 87 operates which is connected with the hoisting drum 48 operating over sheaves mounted on the mast and is used for light loads.

The drum 48 is operatively connected to the train of gears driven by the power take-off 57 and the rotation of the drum is controlled by the operation of the clutch 80 through the bell crank 81, rod 82 and control member 83 in the cab.

It will be readily understood from this description that a crane constructed as described is extremely flexible. It may be brought into use in position where ordinary cranes could not be manipulated and further, in view of the fact that the motive power of the truck is available at the same time as the hoisting mechanism, it is possible to co-ordinate both operative conditions, that is to say, the hoisting mechanism may be operated to lift a load which has to be transferred to some point farther than the swing of the boom will reach, so that after lifting the load the truck operator may operate the traction mechanism of the truck and carry the extended load so that it may be deposited in the desired location.

It will be understood that when the crane telescopic structures are in their retracted position the boom may be raised to such a position that by operating the cables the mast and its supporting legs may be drawn upward and extended by the manipulation of the hoisting drums. When such mast and legs have been extended they may be locked securely by the use of the cross pins described.

The boom itself can be lengthened by sliding the telescopic members outwardly and locking them in their extended positions.

An equipment such as described is found to be extremely effective in general construction work.

It will be understood that the cable sheaves at the base of the crane may, instead of being carried in a pivotal bracket as shown, be mounted in the base of the mast and the cables extended upwardly inside of the mast to sheaves arranged at the top.

It will be noted that a reinforcing beam 87 is arranged at the rear end of the crane platform and extensions 88 are mounted in the cross beam supports of the legs 31 which extend laterally outward and may be blocked at the ends as lateral supports when heavy loads are being handled.

The mechanism for controlling the operation of the boom swinging gear 7 described in detail herein is a standard type and it will be understood that other reverse gear mechanisms may be substituted therefor.

What I claim as my invention is:

1. In an automobile crane, the combination with a truck having an engine and propeller shaft connected with the traction wheels, of a crane mast formed of telescopic tubular sections rotatably mounted at its base end on the truck chassis, a boom formed of telescopic tubular sections pivotally mounted on said mast, tubular telescopic legs mounted on said truck chassis and supporting said mast, means for securing said telescopic sections in various extended positions, means connected with said truck engine for reversibly rotating said mast, hoisting gear mounted on said truck chassis forward of said mast and operatively connected with the propeller shaft and with said mast and boom, and control means for said hoisting gear arranged at the forward end of the truck.

2. An automobile crane as claimed in claim 1, having transverse beams extending laterally beyond the truck chassis, and pivot supports mounted on the extremities of said beams pivotally connected to the bottom ends of said pivotal mast supporting legs.

3. An automobile crane as claimed in claim 1, in which the means for rotating said mast comprises, a gear wheel mounted horizontally on said mast, a pinion meshing with said gear wheel, a reverse gear mechanism operatively connected with said pinion, a shaft extending forwardly of said crane chassis connected with said reverse gear, a power take-off mounted on and driven by said truck engine, and means for controlling said reverse gear mechanism extending to the forward end of said chassis.

4. An automobile crane as claimed in claim 1, in which the means for rotating said mast comprises, a gear wheel mounted horizontally on said mast, a pinion meshing with said gear wheel, a reverse gear mechanism operatively connected with said pinion including a worm gear adapted to hold the mast and boom in various positions of rotation, a shaft extending forwardy from said reverse gear, a power take-off operatively connected with the truck engine, and means for controlling said reverse gear extending to the forward end of the chassis.

5. In an automobile crane, the combination with a truck having an engine and propeller shaft connected with the traction wheels and a crane mounted on the truck chassis, having a mast and mast control devices arranged at the forward end of the truck, of a plurality of hoisting drums parallelly mounted on the forward end of said chassis, gear wheels operatively connecting said drums, a power take-off connected to said engine propeller shaft, means interposed between said power take-off and said drum gears, and means for individually controlling the operation of said drums, from the forward part of the truck adjacent to the mast control devices.

6. In an automobile crane, the combination with a truck having an engine and propeller shaft connected with the traction wheels and a cab at the forward end, of a crane mounted adjacent the rearward end of the truck chassis having a rotatable mast, means for rotating said mast, means for controlling said rotating means extending forwardly to said cab, hoisting drums mounted on the truck chassis forward of said crane, means for driving said drums connected with the truck engine, means for individually controlling the application of power to said drums extending forwardly to said cab, means for holding said drums from rotation, and means for controlling said holding means extending forwardly to said cab.

JOSEPH TANENBAUM.